Jan. 8, 1929.
V. G. APPLE
1,697,897
AUTOMOTIVE ELECTRICAL SYSTEM
Filed May 7, 1927
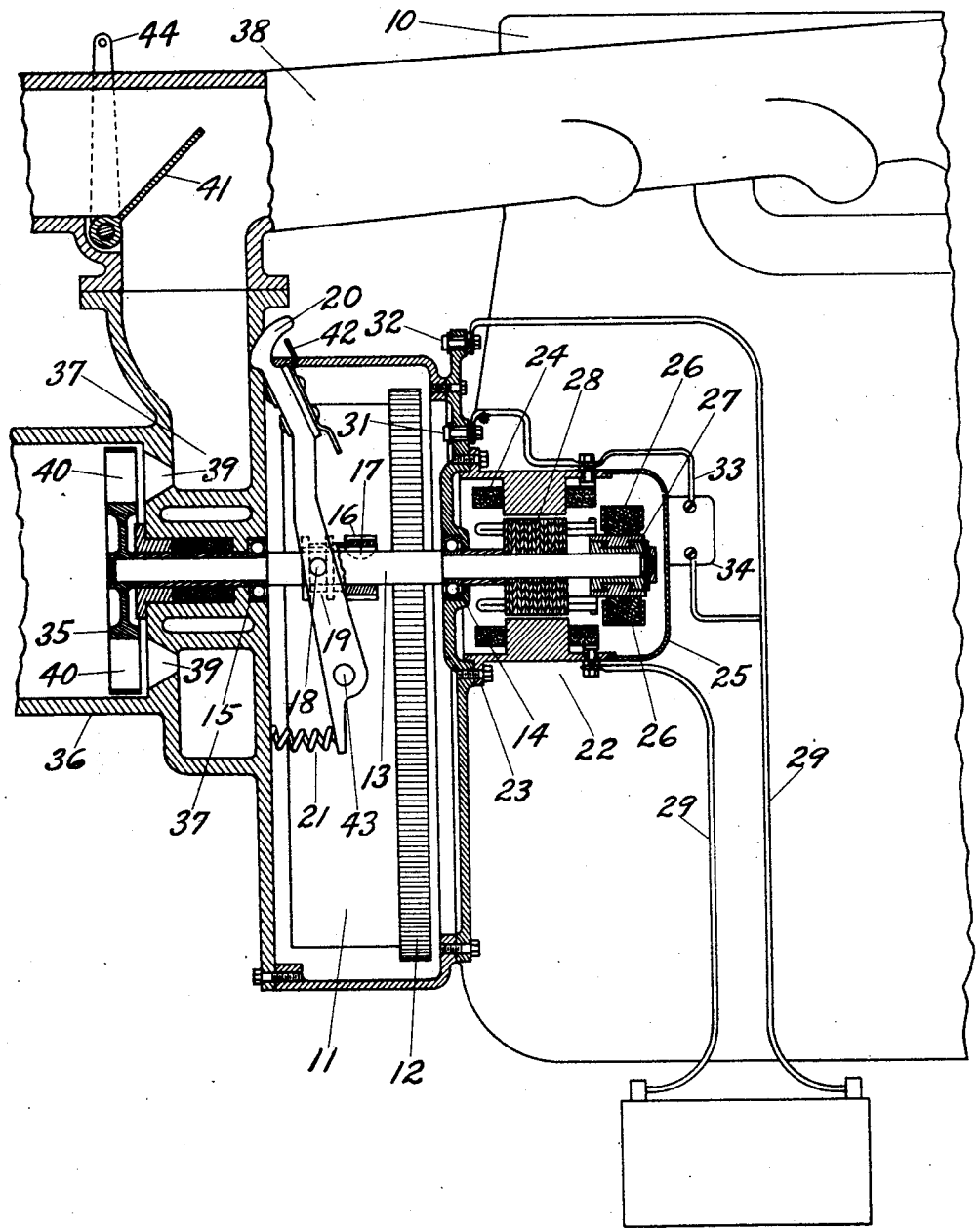

Patented Jan. 8, 1929.

1,697,897

UNITED STATES PATENT OFFICE.

VINCENT G. APPLE, OF DAYTON, OHIO.

AUTOMOTIVE ELECTRICAL SYSTEM.

Application filed May 7, 1927. Serial No. 189,728.

My invention relates to improvements in automotive electrical systems of the class used in conjunction with internal combustion engines, and comprises the usual combination of a battery, a dynamo electric machine driven by the stored energy of the battery to start the engine, and means to convert a portion of the energy of combustion into electrical energy to replace that drawn from the battery in starting the engine and to create a surplus for ignition, lighting and the many other purposes for which current is now required on automotive equipment.

Because of the constantly increasing number of electrically operated appliances used on self propelled conveyances, an increase in the amount of current available for this purpose is desirable, and it is an object of this invention to provide a controllable means whereby a large volume of current may be produced whenever it is required.

Since by conventional methods the production of a large amount of current takes a considerable portion of the engine's power, it is a further object of this invention to provide means whereby this current may be generated without reducing to any appreciable extent the power available to drive the conveyance.

I attain the foregoing objects by the combination of elements shown in the single figure of the accompanying drawing which is a longitudinal-vertical cross section thru the electrical equipment of an automotive engine applied and operated according to the principles of my invention.

The numeral 10 designates an internal combustion engine having the usual flywheel 11 with ring gear 12 attached thereto. A shaft 13 has bearings 14 and 15 in the flywheel housing. Pinion 16 rotated by shaft 13 thru key 17 may however be moved axially on said shaft to engage ring gear 12 when engine 10 is to be started, inasmuch as key 17 fits tightly in its seat in shaft 13 but loosely in the elongated keyway which extends lengthwise thru pinion 16 and its spool like hub. A pedal 20 pivoted at 43 carries pin 18 which engages groove 19 in the hub of pinion 16 to shift it axially into mesh with gear 12. A spring 21 is adapted to return pinion 16 to its normal out of engagement position.

In the position on engine 10 usually occupied by a starting motor, is mounted a dynamo electric machine 22, which consists of a frame 23 carrying field coils 24, a brush cover 25, brushes 26, commutator 27 and armature 28 firmly secured to shaft 13. Cables 29 connect dynamo electric machine 22 to battery 30 for starting when pedal 20 places metal bridge 42 across contacts 31 and 32, and cables 33 thru cutout 34 furnish the battery recharging circuit.

Fixed to the other end of shaft 13 is a turbine wheel 35. A casing 36 surrounds the wheel and a nozzle box 37 receives the exhaust gases of engine 10 thru manifold 38. Nozzles 39 change the pressure of the exhaust gases to velocity before they strike the wheel buckets 40, and a bypass valve 41 may be opened by lever 44 to permit the gases to escape without passing thru the wheel.

The system operates as follows:

To start the engine from rest the pedal 20 is depressed joining contacts 31 and 32 and meshing pinion 16 with gear 12. Current then flows from battery 30 thru dynamo electric machine 22 whereupon engine 10 is turned until it runs on its own power. Pedal 20 is then released to break contacts 31 and 32 and withdraw pinion 16 from gear 12, after which armature 28 is revolved by the turbine wheel 35 to recharge the battery. Cutout 34 operates in the usual manner to close the circuit when sufficient voltage is being generated to overcome the battery voltage. Bypass valve 41 may be opened partially or fully to regulate the charging rate or to suspend charging entirely.

Having described my invention, I claim—

1. In combination, an internal combustion engine, an electric storage battery, a gas turbine adapted to be driven by the exhaust gases of said engine, and a dynamo electric machine adapted to be driven by said battery to start said engine and by said turbine to charge said battery.

2. In combination, an internal combustion engine, an electric storage battery, a gas turbine adapted to be driven by the exhaust gases of said engine, a bypass valve adapted to control the speed of said turbine by controlling the amount of exhaust gases delivered thereto, a dynamo electric machine adapted to be driven by said battery to start said engine and by said turbine to charge said battery.

3. In combination, an internal combustion engine, an electric storage battery, a gas turbine adapted to be driven by the exhaust gases of said engine, a dynamo electric machine adapted to be driven by said battery to start said engine and by said turbine to charge said battery, and means to connect said dynamo electric machine to said engine to start said engine and disconnect said dynamo electric machine from said engine after said engine is running.

4. In combination, an internal combustion engine, an electric storage battery, a gas turbine adapted to be driven from the exhaust gases of said engine, a dynamo electric machine having its revolving member rigidly connected to the wheel of said turbine to rotate in unison therewith, means for temporarily connecting the revolving member of said dynamo electric machine to said engine, and the battery to said dynamo electric machine, whereby said engine is started, and means to disconnect said revolving member of said dynamo electric machine from said engine when said engine is running whereby exhaust gases from said engine may drive said dynamo electric machine by said turbine to charge said battery.

5. In combination, an internal combustion engine, an electric storage battery, a gas turbine adapted to be driven by the exhaust gases of said engine, a dynamo electric machine adapted to be driven by said battery to start said engine, a shaft carrying the rotating members of said turbine and said dynamo electric machine, a pinion on said shaft, a gear on said engine, means to temporarily connect said pinion to said gear and said battery to said dynamo electric machine to start said engine, whereupon said pinion may be released from said gear to permit the exhaust gases of said engine to drive said dynamo electric machine by said turbine to charge said battery.

6. In combination, an internal combustion engine, an electric storage battery, a gas turbine mounted on said engine and adapted to be driven by the exhaust gases thereof, a dynamo electric machine mounted on said engine, a revolvable shaft carrying the rotatable members of said turbine and said dynamo electric machine, a pinion axially movable on said shaft but adapted to rotate therewith, a gear on said engine shaft, means to shift said pinion axially to engage said gear, means to connect said battery to said dynamo electric machine while said pinion and said gear are engaged to cause said dynamo electric machine to revolve said engine until it runs on its own power, and means to disengage said pinion from said gear after said engine is started to permit the exhaust gases to drive said dynamo electric machine by said turbine to charge said battery.

In testimony whereof I hereunto subscribe my name.

VINCENT G. APPLE.